United States Patent [11] 3,615,996

| | | | |
|---|---|---|---|
| [72] | Inventors | Kazumasa Hasegawa;<br>Yasuzi Hosono, both of Mie, Japan | |
| [21] | Appl. No. | 866,795 | |
| [22] | Filed | Oct. 13, 1969 | |
| [45] | Patented | Oct. 26, 1971 | |
| [73] | Assignee | Mitsubishi Petrochemical Co., Ltd.<br>Tokyo, Japan | |
| [32] | Priorities | Oct. 12, 1968 | |
| [33] | | Japan | |
| [31] | | 43/73913;<br>Nov. 7, 1968, Japan, No. 43/81079 | |

[54] SEALING METHOD OF POLYETHYLENE FILMS
9 Claims, 14 Drawing Figs.
[52] U.S. Cl. .................................................. 156/164,
156/163, 156/290, 156/251
[51] Int. Cl. ...................................................... B32b 31/18,
B32b 31/16
[50] Field of Search .......................................... 156/160,
163, 164, 251, 290

[56]     References Cited
UNITED STATES PATENTS

| 2,828,799 | 4/1958 | Harrison, Jr. ................. | 156/163 X |
| 3,342,657 | 9/1967 | Dyer ............................... | 156/163 |
| 3,402,088 | 9/1968 | Young et al. .................. | 156/290 X |
| 3,419,447 | 12/1968 | Hewitt ........................... | 156/251 X |

Primary Examiner—Carl D. Quarforth
Assistant Examiner—S. R. Hellman
Attorney—Sughrue, Rothwell, Mion, Zinn & Macpeak ABSTRACT: A method of sealing polyethylene films which comprises feeding to a sealing slit section piled polyethylene films, prepared by an inflation molding method and having a blow ratio of greater than 2, in the tensioned state at a stress higher than the heat shrinking stress of the polyethylene film in the sealing direction and lower than the stress required to stretch said film 3 percent, and slitting and welding said films while maintaining them in the tensioned state.

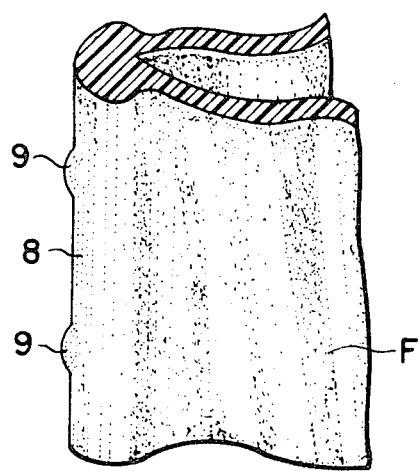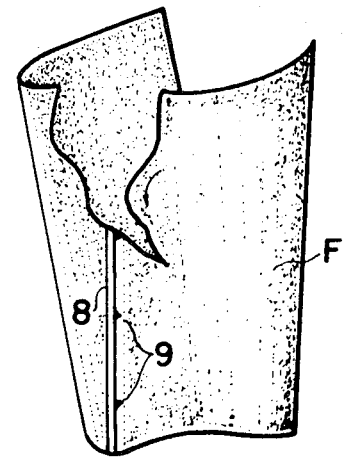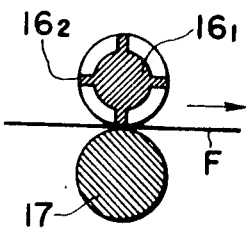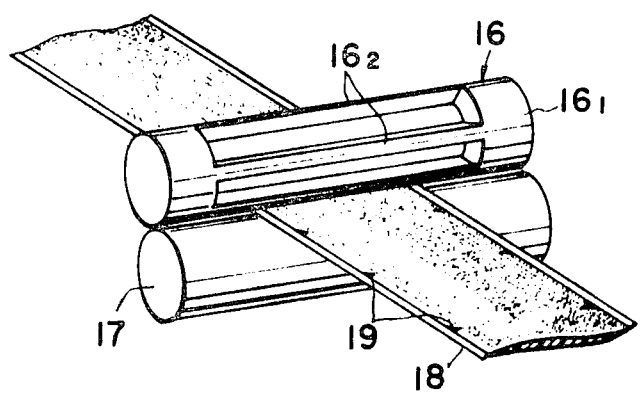

SEALING METHOD OF POLYETHYLENE FILMS

BACKGROUND OF THE INVENTION

1. Field of the Invention

The present invention relates to a sealing method for polyethylene films or sheets, and more particularly it relates to a method for sealing polyethylene films by cutting or slitting two polyethylene films in a piled state, and at the same time welding them at or near the slit portions.

2. Description of the Prior Art

For improving and simplifying packaging, there has been employed a so-called sealing slit system wherein two films or sheets having a rather wide width are piled on top of each other, slit to a desired width and, at the same time, and slit portions are welded to provide a number of slender envelopes. Small pouches can then be made from the envelopes.

Films employed in the aforesaid sealing slit method may be prepared in any manner, but it is preferred to employ wide films prepared by an inflation method, and to fold each film.

In a conventional sealing slit method for polyethylene films, films prepared by an inflation method in which the blow ratio is in a range of 1–2 are used, but the shrinking percentage of the film is 60–90 percent in the machinery direction (or the sealing direction), while the shrinking percentage thereof in the transverse direction (or at a right angle to the sealing direction) is $-30 \sim 0\%$. Obviously, the sealed portions of the film shrink in the machinery direction but not in the transverse direction when the films are subjected to the sealing slit procedure. Accordingly, the sealed portion of the films takes the transverse cross section shown in FIG. 7 of the accompanying drawings, which shows film ($a$) is welded to film ($b$) only at the end portions. Angle ($c_1$), at the sealed portions of the two films, will be an acute angle, and hence the bonding strength of the sealed portion is very weak and the two films ($a$) and ($b$) are split easily at the sealed portion even by applying a weak tension thereto. At the same time, the initially small split readily grows into a large split. Furthermore, as the films shrink in the machinery direction at the sealed portion (as mentioned above), wavy wrinkles are formed along the machinery direction of the sealed portion, which severely harms the appearance thereof. For these reasons, the sealing slit method of preparing pouches and the like has not hitherto been practically applied to polyethylene films prepared by the inflation molding method.

Further, since the sealed portion of the polyethylene films has a low split propagation resistance, the whole sealed portion of the polyethylene films will be split when the sealed portion is locally split. Obviously, if this occurs, the contents of the bag will be spilled.

SUMMARY OF THE INVENTION

The present invention provides a novel method for sealing polyethylene films. The process basically comprises feeding to a sealing slit apparatus a multiply polyethylene film ($s$) prepared by the inflation molding method. The film must have a blow ratio greater than 2, and it must be in the tensioned state at a stress higher than the heat shrinking stress of the polyethylene film in the sealing direction and lower than the stress required to stretch the film 3 percent. The film is then slit and welded while in the tensioned state. Slitting and welding can be either simultaneous or slitting may precede welding. In one alternative, nodes are put into the film. The end result is a film which does not wrinkle, and which provides, in almost all aspects, a product superior to the prior art.

One object of the present invention is to provide an improved sealing slit method for polyethylene films without the fear of readily splitting the sealed portion, and also without being accompanied by the formation of wrinkles.

The above objects of the present invention can be attained by the process of the present invention.

BRIEF DESCRIPTION OF THE DRAWINGS

FIGS. 7–10 illustrate, from various views, actual sealed portions, etc. of films sealed in accordance with the present and conventional methods.

FIGS. 11 and 12 are views of a means for providing nodes to sealed portions of films according to the present invention.

DETAILED DESCRIPTION OF THE PREFERRED EMBODIMENTS

According to the method of the present invention, polyethylene films having a blow ratio greater than 2, prepared by an inflation molding method, are sent to a sealing slit section in a tensioned state at a stress higher than the heat shrinking stress in the sealing direction and lower than the stress which would stretch the film 3 percent. The films are slit and welded while in the state of tension, and, as the case may be, either simultaneously with or immediately after welding, nodes are formed at the sealed portion with a suitable interval between them by applying local pressure on the sealed portion while the sealed portion, in particular the inside of the sealed portion, is in the molten state.

By the term "blow ration greater than 2" is meant that the diameter of a tubular film molded by an inflation molding method is larger than twice the diameter of an annular die used in the molding method. The shrinking percentage of the molded film in the transverse direction is higher than 0 percent (generally higher than 10 percent) and the shrinking percentage in the machinery direction is balanced with the shrinking percentage in the transverse direction.

The piled polyethylene films to be treated by the sealing slit method of the present invention may be prepared by flattening of folding a tubular film produced by the inflation molding method or by cutting such a tubular film into two sheets of film and piling the thus cut films.

Figure 1:
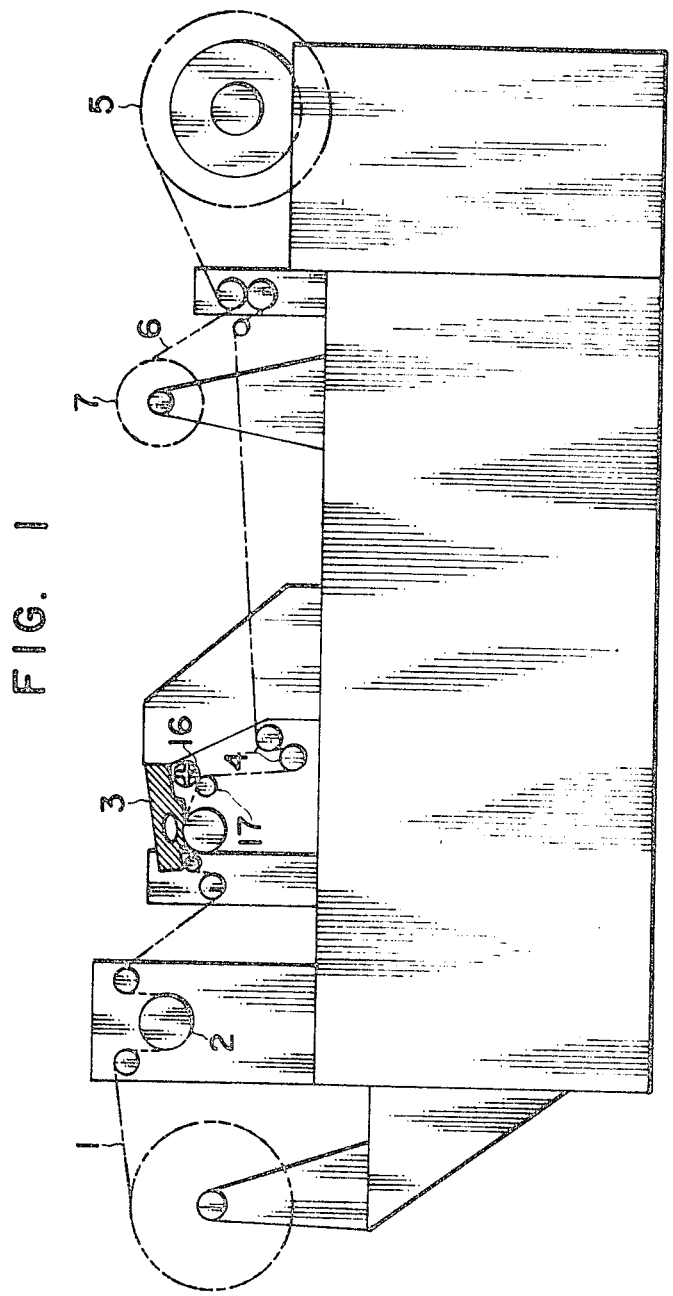
FIGS. 1–6 illustrate, from various views, apparatus useful in the practice of the present invention.
Figure 2:
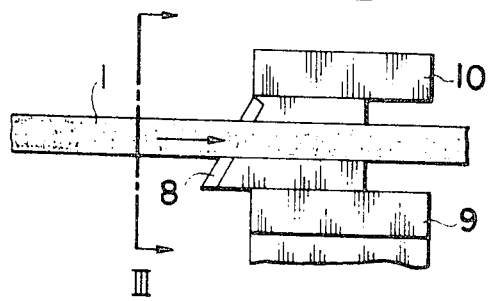
Figure 3:
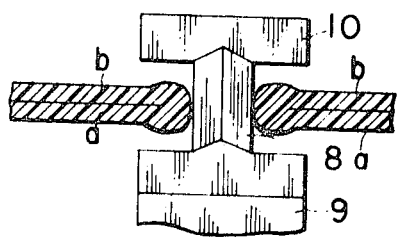
Figure 4:
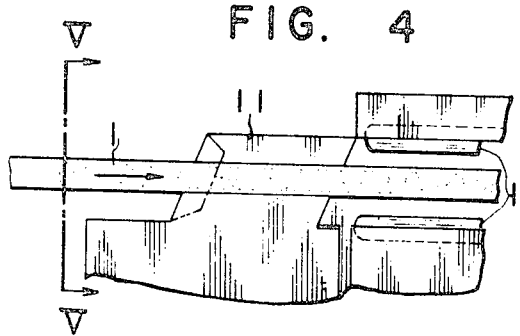
Figure 5:
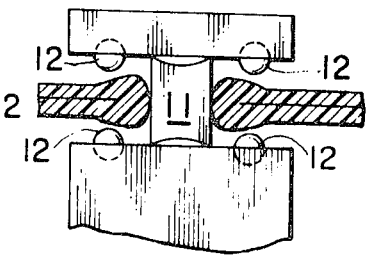
Figure 6:
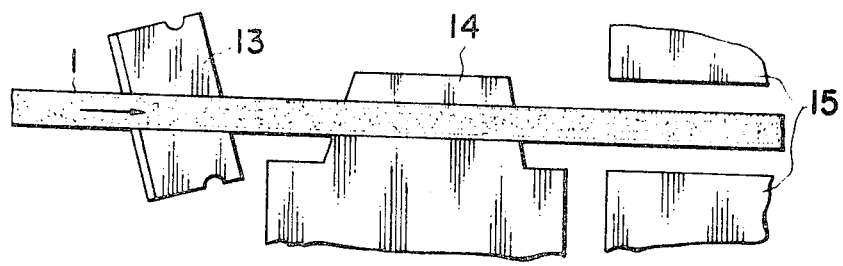
Figure 7:
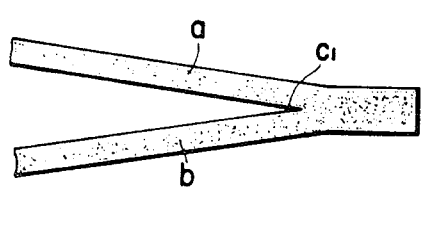
Figure 8:
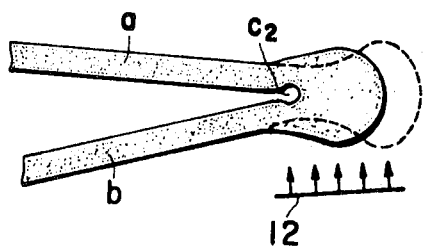
Figure 13:
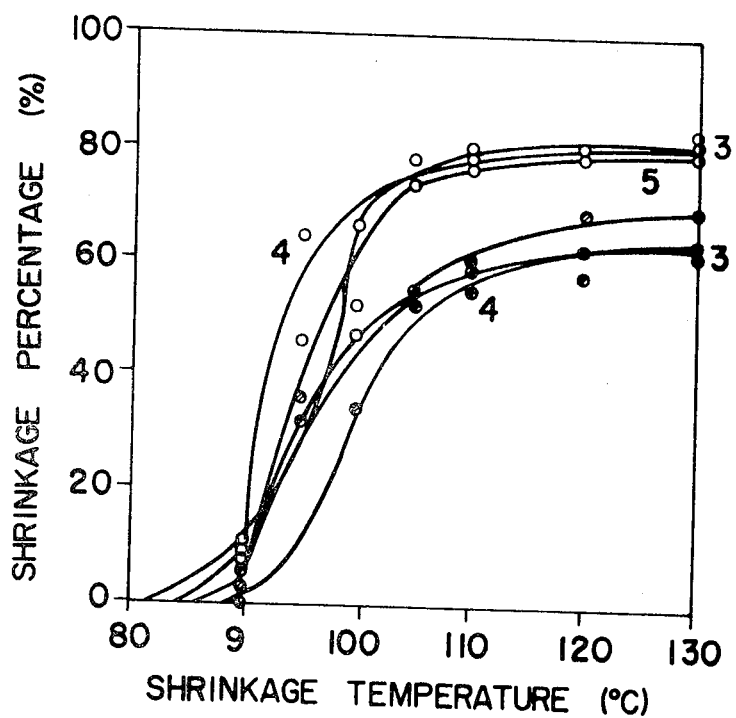
FIGS. 13 and 14 are graphs showing the relationships of various parameters for polyethylene film.
Figure 14:
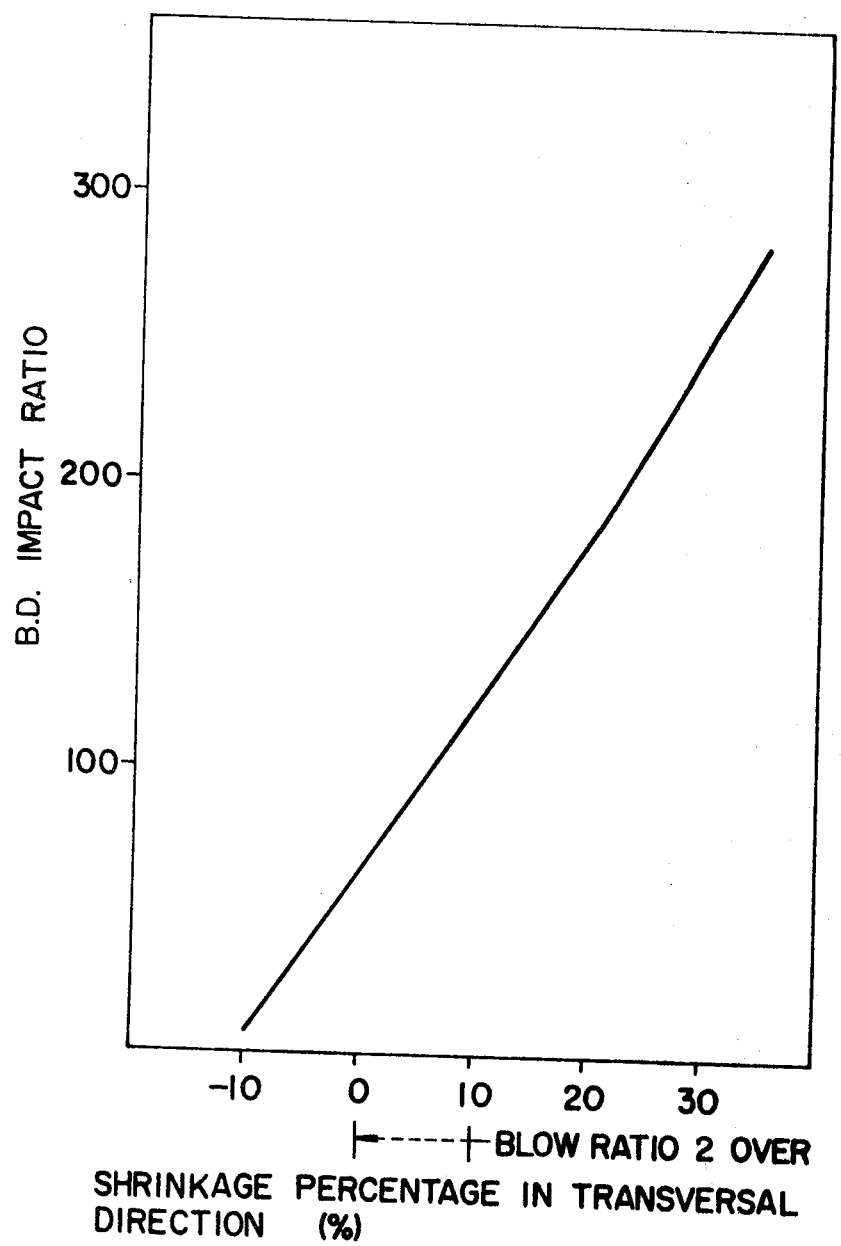

Now, the invention will be described in detail with reference to the accompanying drawings, in which:

FIG. 1 is a schematic side view showing the outline of a sealing slitter by which the method of the present invention can be carried out;

FIG. 2 is a side view of the sealing slitter blade in FIG. 1;

FIG. 3 is a sectional view taken along line A—A of FIG. 2;

FIG. 4 is a side view showing another embodiment of a sealing slitter used in the present invention;

FIG. 5 is a sectional view taken along line B—B of FIG. 4;

FIG. 6 is a side view showing a still yet another embodiment of a sealing slitter used in the present invention;

FIG. 7 is a sectional view showing a sealed portion of films sealed by a conventional method;

FIG. 8 is a sectional view showing the sealed portion of films treated by the sealing slit method of the present invention;

FIG. 9 is an enlarged perspective view showing the sealed portion of films having nodes by the sealing slit method of the present invention;

FIG. 10 is an enlarged perspective view showing the splitting state of the sealed portion of FIG. 9, said split along the sealed portion being stopped at the node;

FIG. 11 is a perspective view showing the main part of an embodiment of a practical means for providing nodes to the sealed portion of films according to the method of the present invention;

FIG. 12 is a vertical sectional view of the means shown in FIG. 11;

FIG. 13 is a graph showing the relationship of the shrinking temperature of polyethylene film and the shrinking percentage thereof; and FIG. 14 is a graph showing the relationship between the shrinking percentage and the BD strength of a pouch prepared by the method of the present invention.

DETAILED DESCRIPTION OF THE DRAWINGS

Returning now to the drawings, there is shown in FIG. 1 an embodiment of a sealing slitter used in the process of the present invention. A tubular polyethylene film 1 formed by an inflation molding method with a blow ratio greater than 2 is in a flat state rolled into a bobbin, which is mounted at the end of the system. The film is rolled around a roll 5 through an ironing roll 2, a sealing slit blade 3, and a cooling roll 4. the edge 6 formed by the sealing slit procedure is rolled around a roll 7.

FIG. 2 and FIG. 3 show the details of the sealing slit blade 3 in the sealing slitter means shown in FIG. 1. A knife edge shaped blade 8 having the edge at the front face thereof is supported between a pair of heating means 9 and 10 spaced vertically, and a film 1 is set to the blade 8 from the left to the right in FIG. 2. This is in a tensioned state at a stress higher than the heat shrinking stress of the film in the sealing direction, but at a stress lower than the stress necessary to stretch the film 3 percent, preferably at a stress of 40–300 g./mm.$^2$. For example, when the film temperature under the aforesaid heaters 9 and 10 is 125° C. and the thickness of polyethylene film to be sealed is 0.02–0.05 mm., the heat shrinking stress of the polyethylene film is 6.2–38.5 g./mm.$^2$. In such a case, a tension of higher than 38.5 g./mm.$^2$ is applied to the film. As the stress necessary to stretch the polyethylene film to 3 percent is 700 g./mm.$^2$, the film is stretched at a stress much lower then this value and within the invention limits.

In such a tension state, the double of piled films ($a$) and ($b$) are slit by means of the blade 8, and at the same time the slit ends of the films are welded along the side walls or faces of the blade 8 heated as shown in FIG. 3.

Since in this case the films to be welded are polyethylene films, the slit ends thereof are shrunk by the action of the heat in the longitudinal direction, and the shrinkage of the films in the longitudinal direction is substantially the same as the shrinkage of the total film in the longitudinal direction occurring when the aforesaid tension is released from the films. This balancing of the shrinkage prevents the formation of wrinkles. Moreover, as the film 1 is a polyethylene film having a blow ratio greater than 2, prepared by an inflation molding method, the aforesaid sealed end of the films shrinks in the transverse direction, and accordingly the welded portion takes a rounded shaped as shown in FIG. 8. The angle ($c_2$) at the sealed portion of films ($a$) and ($b$) becomes round and large, and hence the sealed portion of the films becomes less splittable and the split propagation resistance of this portion is increased.

However, if the shrinkage of the sealed portion in the machinery direction is excessively large, e.g., higher than 90° percent, wrinkles are formed in the longitudinal direction. Thus, the heating by the sealing slit blade 8 must be so controlled that this "over shrinkage" in the transverse direction does not occur. Furthermore, after sealing the films as mentioned above, the sealed portion may further be heated if necessary.

FIG. 4 and FIG. 5 show the latter type of sealing slit, i.e., one having an additional heating means wherein two pairs of heaters 12—12 and 12—12 are equipped vertically behind the slit seal blade 11.

By means of the sealing slit device as shown in FIG. 4 and FIG. 5, the films 1 are slit and sealed by means of the sealing slit blade 11. Thereafter, the sealed portions are further heated by the heaters 12—12 and 12—12, respectively, from the upper and lower sides of the sealed portions. The sealed portions of the films will thus shrink in the transverse direction as shown in FIG. 8, and hence the thickness of the sealed portion will increase, as well as the sealed portion being annealed. Thus, the mechanical strength of the sealed portion of the films is increased and the angle ($c_2$) at the sealed portion of the films ($a$) and ($b$) becomes rounder and larger, which provides excellent split propagation resistance to the sealed portion. The temperature of heating by heaters 12—12 and 12—12 is that at which the film shrinks, and is preferably 60–130° C.

In the above-mentioned embodiments of devices for conducting the sealing slit method of the present invention, the slitting and welding of the films is conducted simultaneously at the blade 8 and blade 11. Of course, slitting and welding may be conducted separately. The latter embodiment is illustrated in FIG. 6, in which a sealer 14 for welding slit films is disposed behind a slitter blade 13 which conducts only the slitting of the films. Further, heaters 15–15 for heating the sealed portion of the films from the upper and lower sides are placed behind the sealer 14.

As mentioned above, in the method of the present invention, polyethylene films having a blow ratio greater than 2 prepared by inflation molding are slit and welded in a tensioned state at a stress higher than the heat shrinking stress of the film in the sealing direction and less than the stress which will stretch the film to 3 percent. Hence, the shrinkage of the sealed portion in the machinery direction is balanced by the shrinkage of the total composite film, which prevents the formation of wrinkles. Further, the angle at the sealed portion of the films becomes round and large due to the shrinkage at the sealed portion in the transverse direction, whereby a seal having a high strength and a beautiful appearance can be obtained.

The aforesaid shrinking percentage in the present specification is one measured as follows: when a film strip 10 cm. by 10 cm. is immersed in a silicon oil and heated to its shrinking temperature without the application of any load to the film for 3 minutes. The relationship between the shrinking temperature and the shrinking percentage is shown in FIG. 11, wherein the numerals 3, 4 and 5 stand for blow ratios, the mark ● stands for shrinking in the machinery direction, and the mark stands for shrinking in the transverse direction.

The stress applied to the films in the machinery direction at sealing must be, as mentioned above, higher than the heat shrinking stress of the films in the sealing direction and lower than the stress which will stretch the films to 3 percent. The optimum stress has been found to be 40–300 g./mm.$^2$.

It has hitherto not always been easy to prepare a stable polyethylene film having good quality by an inflation molding method with a blow ratio larger than 2. This is because if the blow ratio is increased during molding by an inflation method, the resin from the die is rapidly expanded, which results in the formation of a film of uneven quality due to uneven thickness (deflection) and uneven cooling in the circumference of the expanded resin film.

According to the processes described in the above patent applications, a tubular polyethylene resin which has been extruded through an annular die is expanded not in one step, but stepwise by drawing said tubular film through a cooling ring group wherein a plurality of annular cooling air blowing slits (having diameters which become larger stepwise with a desired ratio) are disposed coaxially in a multiple structure. Hence, the tubular resin can be expanded stepwise to any desired blow ratio. By these processes an inflation molding of a high blow ratio, hitherto considered to be inapplicable, can be used in the production of polyethylene films.

Polyethylene films prepared by the inflation molding with a blow ratio higher than 2 have a large shrinking percentage as shown in FIG. 11, and are suitable as films to be sealed by the method of the present invention.

Polyethylene films sealed by the method of the present invention (as mentioned above) have a very high sealing strength as compared with films sealed by conventional methods. However, to further increase the sealing strength, the following procedure may be added to the aforesaid method: simultaneously with the welding of the polyethylene films (or after welding but while the sealed portion is in a molten state), the sealed portion is pressed, with a suitable distance between presses. If the sealed portion is solidified, the portion may be melted by reheating it before the portion is locally pressed. By the application of local pressure, the sealed films will develop nodes at the sealed portions as shown in FIG. 9, whereby the width of the sealed portion is locally increased and the films are bonded more strongly at the nodes. Therefore, when the splitting phenomenon occurs locally at the sealed portion and it reaches the node, the node prevents further propagation of the split, and hence the propagation of the split can be stopped in a small area, even if it occurs.

An example of providing such nodes to the sealing portions of the polyethylene films is shown with reference to FIG. 1, FIG. 11 and FIG. 12. A node-forming means 16 is provided as shown in FIG. 1 for successively forming discontinuous nodes 19 with a suitable distance between them. This is done at the sealed portions 18 of films prepared by means of the sealing slit mechanism 3 as shown in FIG. 11. The node-forming means 16 is composed of a cylindrical member $16_1$ having a plurality of projections $16_2$ on the member along the axial direction and by passing polyethylene films having sealed portions at the opposite sides thereof between the node-forming member and an opposed roll 17, while rotating said node-forming member 16. In this manner, the sealed portions which are in a molten state are intermittently pressed by the projections $16_2$ to locally deform the sealed portions and thereby form nodes 19 as shown in FIGS. 11 and 12.

The invention will further be explained by the following example.

EXAMPLE

The results of comparing the polyethylene pouches prepared by the method of the present invention (using the FIG. 1 apparatus) with polyethylene pouches prepared by a conventional method are as follows:

| Condition | Conventional Method | Method of this Invention |
| --- | --- | --- |
| Film thickness (mm.) | 0.03 | 0.03 |
| Sealing rate (m./min.) | 30 | 30 |
| Width of product (mm.) | 200 | 200 |
| Shrinking percentage in transverse direction (%) | −20% | +25% |
| Effect | | |
| B.D. strength*** | 5–10 cm. | 260 cm. |
| Appearance | no good | good |
| Slip propagation resistance | no good | good |
| Haze value** | (2) | (1) |
| Blocking*** | (2) | (1) |

*The B.D. strength is the "bag drop" strength which is shown by the maximum drop weight, which a bag can survive without damage when 4.5 kg. of sand is charged in a bag having a width of 200 mm. and a length of 400 mm. and a definite length and the bag is dropped from the "bag drop" height.
 and *: Two cases are compared and (1) is superior to (2).

As mentioned above, the strength of the sealed portions sealed by the process of this invention is higher as the shrinking percentage of the sealed portion in the transverse direction is larger.

FIG. 14 shows the relation between the shrinking percentage in the transverse direction and the B.D. strength ratio (the value of the bag drop strength at the sealed portion when the bag drop strength of the original films **** is assumed to be 100) in the machinery direction. The sealing conditions in this example were as follows:

Resin: low density polyethylene M.I.=2
s.g.=0.924
Molding machine: 50 Extruding machine made by Mitsubishi Heavy Industry Ltd.
Die diameter: 30 m./min.
Hot knife temperature for sealing: about 500° C.
Blow ratio: approximately 2.1
Thickness of film: 0.03 mm.
*** same resin, apparatus, width, etc., but blow ratio is 1.7. Conditions in accord with ASTM D-1709.

The heat shrinking stress in the machinery direction was 17 g./mm.$^2$, and the stretching stress was 200 g./mm.$^2$.

What is claimed is:

1. A method of sealing polyethylene films which comprises:
   feeding to a sealing slit section piled polyethylene films, prepared by an inflation molding method and having a blow ratio of greater than 2, in the tensioned state at a stress higher than the heat shrinking stress of the polyethylene film in the sealing direction and lower than the stress required to stretch said film 3 percent, and
   slitting and welding said films while maintaining them in the tensioned state.

2. The sealing method as claimed in claim 1, wherein said polyethylene films are tensioned in the sealing direction at a stress of 40–300 g./mm.$^2$.

3. The sealing method as claimed in claim 1, wherein said polyethylene films are slit and welded simultaneously.

4. The sealing method as claimed in claim 3 wherein said slitting and welding are conducted by a sealing slit blade heated to welding temperature.

5. The sealing method as claimed in claim 1, wherein the polyethylene films slit and then welded.

6. A method of sealing polyethylene films which comprises:
   feeding to a sealing slit section multiply polyethylene films prepared by the inflation molding method and having a blow ratio of higher tan 2, said films being in a tensioned state at a stress greater tan the heat shrinking stress of the polyethylene film in the sealing direction and lower than the stress requires to stretch said film 3 percent,
   slitting and welding said films in the tensioned state, and
   heating said sealed portions of the films from the upper and lower sides thereof.

7. The sealing method as claimed in claim 6, wherein said temperature of heating the sealed portions is from 60° to 130° C.

8. A sealing method for polyethylene films which comprises:
   feeding to a sealing slit section multiply polyethylene films prepared by the inflation molding method and having a blow ratio greater than 2, said films being in a tensioned state at a stress greater than the heat shrinking stress of the polyethylene film in the sealing direction and lower than the stress required to stretch said films 3 percent,
   slitting and welding said films while in the tensioned state,
   and intermittently pressing the sealed portions of the films when in the molten state to provide nodes to the sealed portions.

9. The sealing method as claimed in claim 8 wherein said pressing is conducted by passing said polyethylene films having sealed portions at the opposite edges through a space between a rotary node-forming roll having a plurality of longitudinal projections on said roll and an opposed roll.